United States Patent

Burton

[15] 3,648,236

[45] Mar. 7, 1972

[54] DECODING METHOD AND APPARATUS FOR BOSE-CHAUDHURI-HOCQUENGHEM CODES

[72] Inventor: Herbert O. Burton, Little Silver, N.J.

[73] Assignee: Bell Telephone Laboratories, Incorporated, Murray Hill, N.J.

[22] Filed: Apr. 20, 1970

[21] Appl. No.: 30,044

[52] U.S. Cl. ....................340/146.1

[51] Int. Cl. ....................G06f 11/00, G08c 25/00

[58] Field of Search ....................340/146.1, 172.5; 235/153

[56] References Cited

UNITED STATES PATENTS 3,278,729 10/1966 Chien ....................340/146.1 X 3,418,629 12/1968 Chien ....................340/146.1

OTHER PUBLICATIONS

Burton, Inversionless Decoding of Binary BCH Codes, IEEE Transactions on Information Theory, Vol. IT- 17, No. 4, July 1971.

*Primary Examiner*—Charles E. Atkinson

*Attorney*—R. J. Guenther and Kenneth B. Hamlin

[57] ABSTRACT

A method and apparatus are disclosed for decoding BCH codes. The disclosed method is an improvement of the so-called Berlekamp algorithm. A code word encoded in a t-error-correcting BCH code is first processed to obtain the power sum symmetric functions thereof. Utilizing these functions, certain equations are recursively solved by the arithmetic operations of addition and multiplication to obtain a polynomial whose roots give the location of errors in the code word.

9 Claims, 3 Drawing Figures

INVENTOR
H. O. BURTON
BY Calvin E. Thorpe
ATTORNEY

FIG. 3

| $i$ | $\alpha^i$ |
|---|---|
| 0 | 00001 |
| 1 | 00010 |
| 2 | 00100 |
| 3 | 01000 |
| 4 | 10000 |
| 5 | 00101 |
| 6 | 01010 |
| 7 | 10100 |
| 8 | 01101 |
| 9 | 11010 |
| 10 | 10001 |
| 11 | 00111 |
| 12 | 01110 |
| 13 | 11100 |
| 14 | 11101 |
| 15 | 11111 |
| 16 | 11011 |
| 17 | 10011 |
| 18 | 00011 |
| 19 | 00110 |
| 20 | 01100 |
| 21 | 11000 |
| 22 | 10101 |
| 23 | 01111 |
| 24 | 11110 |
| 25 | 11001 |
| 26 | 10111 |
| 27 | 01011 |
| 28 | 10110 |
| 29 | 01001 |
| 30 | 10010 |
| 31 | 00001 |

DECODING METHOD AND APPARATUS FOR BOSE-CHAUDHURI-HOCQUENGHEM CODES

BACKGROUND OF THE INVENTION

1. Field of the Invention

This invention relates to data processing systems and more particularly to random error correction in such systems.

2. Description of the Prior Art

The need for controlling and limiting digital errors in the transmission and processing of digital data has long been recognized. Normally, such digital data is represented by sequences of binary signals (referred to as bits), wherein each sequence (or data word) comprises a fixed number of bits. Information messages are then represented by different combinations of data words just as combinations of symbols of the alphabet represent words.

Numerous methods have been developed for improving the accuracy of transmission and processing of data words. One such method involves encoding the data words into code words (of certain predetermined codes) which contain not only the original data words but also additional or redundant information (parity digits). Such code words may then be processed in certain prescribed ways to determine whether or not errors have occurred in the code words and the positions of any such errors.

Codes have been discovered for correcting random errors (errors occurring randomly throughout the transmitted data), burst errors (errors occurring in "bunches"), or both random and burst errors. One of the best known class of codes for correcting random errors are the so-called Bose-Chaudhuri-Hocquenghem (BCH) codes described, for example, in Peterson, W. W., *Error-Correcting Codes*, the M.I.T. Press and John Wiley, 1961, pp. 162–182 and "Codes Correcteurs D'erreurs," Chiffres, Vol. 2, pp. 147–156, Sept., 1959.

A number of procedures have been devised for decoding BCH codes including those described in the aforementioned Peterson text, pp. 175–180, in Meggitt, J. E., "Error-Correcting Codes and Their Implementation for Data Transmission Systems," *IRE Trans. on Information Theory*, Vol. IT–7, pp. 234–244, Oct., 1961, and in Banerji, R. B., "A Decoding Procedure for Double-Error Correcting Bose-Ray-Chaudhuri Codes," *Proc. IRE*, (Correspondence), Vol. 49, p. 1585, Oct., 1961. One of the most efficient and easily implementable decoding procedures or algorithms for BCH codes is that discovered by E. R. Berlekamp and described in Berlekamp, E. R., *Algebraic Coding Theory*, McGraw-Hill Book Co., 1968, p. 194 et seq. The Berlekamp algorithm includes a recursive procedure for determining error positions in received code words from the power sum symmetric functions thereof. This recursive procedure, although one of the easiest to implement, nevertheless requires the arithmetic operation of division and therefore requires complicated inversion circuitry.

SUMMARY OF THE INVENTION

In view of the above-described prior art methods and arrangements, it is an object of this invention to provide a more efficient method and apparatus for decoding BCH codes.

It is another object of the present invention to provide decoding apparatus which does not require inversion circuitry.

These and other objects of the present invention are realized in a specific illustrative system embodiment in which information sequences which have been encoded in a $t$-error-correcting BCH code are processed to first obtain the power sum sum symmetric functions thereof, represented by $S_1, S_2 \ldots S_{2t}$. From these functions, the polynomial $V^{(2t)}$ is generated by the recursive procedure $V^{(2k+2)}(z)=\delta^{(2k-2)}V^{2(k)}+d^{(2k)}K^{(2k)}z$ $$K^{(2k+2)}(z)=\begin{cases} z^2K^{(2k)} \text{ if } d^{(2k)}=0 \text{ or if deg. } [V^{(2k)}] > k \\ zV^{(2k)} \text{ if } d^{(2k)} \neq 0 \text{ and deg. } [V^{(2k)}] \leq k \end{cases}$$

$$\delta^{(2k)}=\begin{cases} \delta^{(2k-2)} \text{ if } d^{(2k)}=0 \text{ or if deg. } [V^{(2k)}] > k \\ d^{(2k)} \text{ if } d^{(2k)} \neq 0 \text{ and deg. } [V^{(2k)}] \leq k, \end{cases}$$

where $V^{(0)}(z)=1$, $K^{(0)}(z)=1$, $\delta^{(2k)}=1$ if $k<0$,
$1+S(z)=1+S_1z+S_2z^2+S_3z^3+\ldots$,
$d^{(2k)}$ is the coefficient of $z^{2k+1}$ in the product $[1+S(z)]V^{(2k)}(z)$, and deg.[*] represents the degree of the polynomial *. The polynomial $V^{(2t)}(z)$ is then processed in a standard manner to obtain the reciprocal roots thereof which specify the error positions in the sequence in question.

As can be seen from the above description only the arithmetic operations of addition and multiplication are necessary to carry out the procedure. Thus, the need for complicated inversion circuitry (to implement the procedure) is eliminated.

BRIEF DESCRIPTION OF THE DRAWINGS

A complete understanding of the present invention and of the above and other objects and advantages thereof may be gained from a consideration of the following detailed description of an illustrative embodiment thereof presented hereinbelow in connection with the accompanying drawings, in which:

FIG. 3 gives a table of values of the elements $\alpha^i$ of the field over which the (31,16) BCH code is defined.

DETAILED DESCRIPTION

Figure 1:
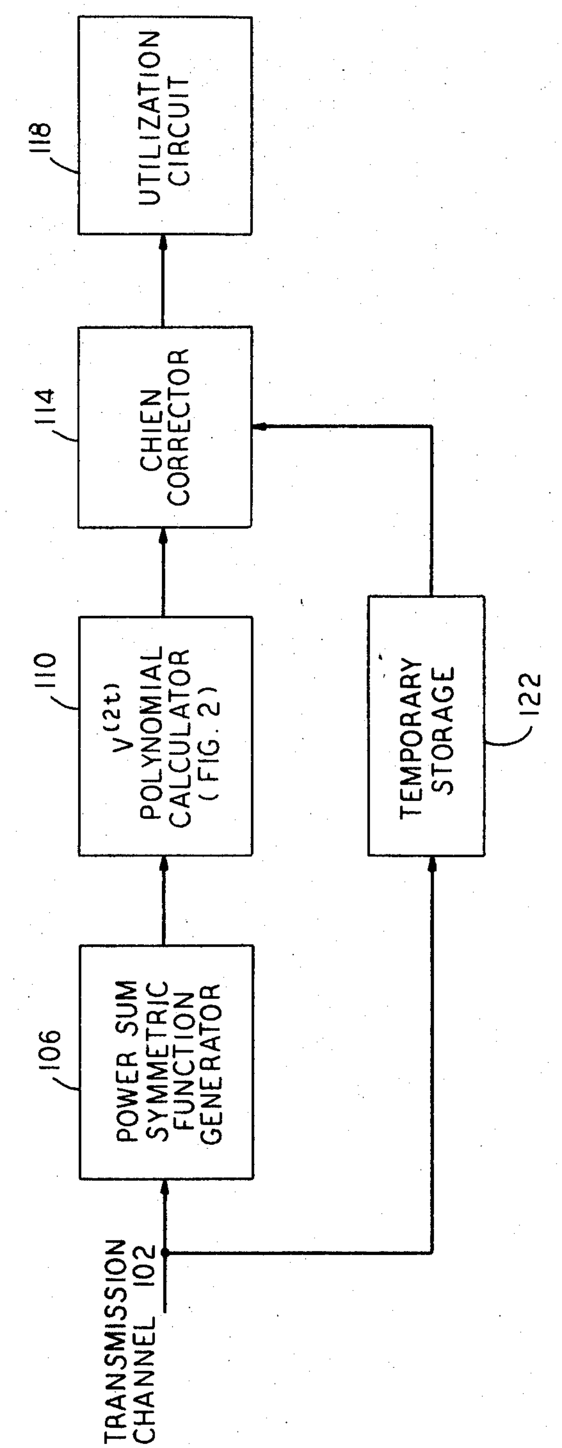
FIG. 1 shows a generalized decoder for decoding BCH codes in accordance with the present invention.

Before discussing the method and apparatus of the present invention, a general description of BCH codes will first be given. A BCH code of length $n=2^m-1$ can, with at most $mt$ check bits, correct any set of $t$ independent errors (or alternatively detect any set of $2t$ errors) within a block of $n$ bits. The integers $m$ and $t$ are arbitrary positive integers.

A $t$-error-correcting BCH code may be described as the set of all polynomials $\{a(x)\}$ over the Galois Field GF(2) of degree $n-1$ or less, such that $$a(\alpha^i)=0 \qquad i=1, 3, 5 \ldots 2t-1$$

where $\alpha$ is a primitive element of the finite field GF($2^m$), $a(x)=a_0+a_1x+a_2x^2+\ldots+a_{n-1}x^{n-1}$, and $a_j=0, 1$ ($j=0, 1, 2 \ldots n-1$). In other words, $a(x)$ is a code word of the BCH code if and only if $a(\alpha^i)=0$. These polynomials or code words consist of all the multiples of the polynomial G($x$), known as the generator polynomial of the code. G($x$) is the polynomial of least degree which satisfies the equations $G(\alpha^i)=0$, $i=1, 3, 5 \ldots 2t-1$.

A code word which has been transmitted over a communication channel may be represented by $$r(x)=a(x)+e(x)$$

where $e(x)$ represents the error pattern word [i.e., the errors which occurred in the transmitted code word $a(x)$]. By substituting the primitive polynomials $\alpha^i$ in $rx$), the following is obtained:

$$r(\alpha^i)=a(\alpha^i)+e(\alpha^i)=e(\alpha^i)=S_i \qquad i=1, 3 \ldots 2t-1$$

The functions $S_i$ are known as the power sum symmetric functions. These functions can be utilized to determine the location of errors in the transmitted data sequences. See, for example, the aforecited Peterson text and Chien, R. T., "Cyclic Decoding Procedures for Bose-Chaudhuri-Hocquenghem Codes," *I.E.E.E. Trans. on Info. Theory*, Oct. 1964, pp. 357–363. One of the most easily implementable methods of determining the locations of errors from the power sum symmetric functions is that discovered by E. R. Berlekamp mentioned earlier.

The present invention, which is an improvement of the Berlekamp method, may, for a $t$-error-correcting BCH code, be defined as follows. First define $V^{(0)}(z)=1$, $K^{(0)}(z)=1$, $\delta^{(2k)}=1$ if $k<0$, and $1+S(z)=1+S_1z+S_2z^2+S_3z^3+\ldots$, where $z$ is a dummy variable and $S_k$ is the $k^{th}$ power sum symmetric function of a received code word. (Each $S_k$ for odd $k$ uniquely determines $S_{2k}$ since $S_{2k}=S_k{}^2$.) Further define $d^{(2k)}$ as the coefficient of $z^{2k+1}$ in the product $[1+S(z)]$ The polynomial $V^{(2t)}(z)$ is then calculated by recursively applying the following equations:

$$V^{(2k+2)}(z)=\delta^{(2k-2)}V^{(2k)}(z)+d^{(2k)}K^{(2k)}(z)\,z$$

$$K^{(2k+2)}(z)=\begin{cases} z^2K^{(2k)}(z) \text{ if } d^{(2k)}=0 \text{ or if deg. } [V^{(2k)}(z)]>k \\ zV^{(2k)}(z) \text{ if } d^{(2k)}\neq 0 \text{ and deg. } [V^{(2k)}(z)]\leq k \end{cases}$$

$$\delta^{(2k)}=\begin{cases} \delta^{(2k-2)} \text{ if } d^{(2k)} \text{ if } d^{(2k)}\neq 0 \text{ and deg. } [V^{(2k)}(z)]\leq k. \\ d^{(2k)} \text{ if } d^{(2k)}\neq 0 \text{ and deg. } [V^{(2k)}(z)]\leq k. \end{cases}$$

The reciprocal roots of the polynomial $$V^{2t}(z)=(1+\sigma_1 z+\sigma_2 z^2+\ldots+\sigma_e z^e)C$$
$$=(1-z\alpha^{k_1})(1-z\alpha^{k_2}\ldots)(1-z\alpha^{k_e})C$$

define the error locations in the received code word, where $e$ is the number of errors in the code word, provided $e\leq t$, $C$ is a constant, and $k_i$ is the position of error $i$ counting from the high order end of the received code word. Equivalently, the *roots* of the reciprocal polynomial of $V^{2t}(z)$—$(\sigma_e+\sigma_{e-1}z+\ldots+z^e)C$—define the error locations in the received code word. The Chien method or search (see the aforecited Chien reference) can be applied to obtain the reciprocal roots of $V^{2t}$(zor equivalently the roots of the reciprocal polynomial of $V^{2t}$(zwill now be given.

Assume that information sequences are encoded in a (31,16triple-error-correcting BCH code. The values of the elements $\alpha^j$, where $j=0$, $i$. . .30, of the field over which the code is defined are given in FIG. 3. Now assume that errors have occurred in a received code word in positions 3, 7 and 17, where the positions of a code word are numbered from 0 to 30. The corresponding elements identifying these error positions are, from FIG. 3, $\alpha^3$=01000, $\alpha^7$=10100, and $\alpha^{17}$=10011. The positions of these errors would be determined in accordance with the present invention as follows.

First, the power sum symmetric functions $S_1$, $S_3$ and $S_5$ of the received sequence are generated. The values of these functions in the present example are:

$S_1=r(\alpha)=a(\alpha)+e(\alpha)=e(\alpha)=\alpha^3+\alpha^7+\alpha^{17}=$01111x$a$23
$S_3=r(\alpha^3)=a(\alpha^3)+e(\alpha^3)=e(\alpha^3)=(\alpha^3)^3+(\alpha^7)^3+(\alpha^{17})^3=$01110$=\alpha^{12}$, and
$S_5=r(\alpha^5)=a(\alpha^5)+e(\alpha^5)=e(\alpha^5)=(\alpha^3)^5+(\alpha^7)^5+(\alpha^{17})^5$ The accuracy of these values can be checked by referring to FIG. 3.

Utilizing the above-generated power sum symmetric functions and the definitions $V^{(0)}=1$ and $K^{(0)}=1$, the functions $d^{(0)}$ and $\delta^{(0)}$ are next generated. (For convenience, the dummy variable $z$ will be dropped when discussing any $V$ $K^{(2\kappa)}$ ($zd^{(2\kappa)}$ is the coefficient of $z^{2\kappa+}$ in the product $[1+S(z)]V^{(2\kappa)}$. Here, for $k=0$ the expression $[1+S(z)]V^{(2\kappa)}$ reduces simply to $[1+S(z)]$. $1=1+S_1 2+S_2z^2+\ldots=1+\alpha^{23}z+\alpha^{15}z^2+\ldots$. (It should be noted that $S_2$ in the above equation was obtained from the equation $S_2=S_1{}^2=(\alpha^{23})^2=\alpha^{15}$.) Thus, the coefficient of $z^{2k+1}=z^{2\cdot 0+1}=z$ in the above expression is simply $\alpha^{23}$. So, $d^{(0)}=\alpha^{23}$ $^{23}$. Also recall that $\delta^{(2K)}=d^{(2k)}$ if $d^{(2K)}\neq 0$ and deg. $[V^{(2k)}]\leq$ k. Since $d^{(2k)}=d^{(0)}=\alpha^{23}\neq 0$ and the degree of $[V^{(2\kappa)}=V^{(0)}=1]$ is $\leq k=0$, $\delta^{(0)}=d^{(0)}=\alpha^{23}$.

Further, for $k=0$, $V^{(2)}=\delta^{(-2)}V^{(0)}+d^{(0)}z\,K^{(0)}$. Since $\delta^{(2k)}=1$ if $kA0$, $\delta^{(-2)}=1$ and thus $V^{(2)}=1za23z$. The term $K^{(2)}$ equals $zV^{(0)}$ since $d^{(0)}\neq 0$ and the degree of $V^{(0)}\leq k=0$, i.e., $K^{(2)}=z$.

For $k=1$, the following parameters are generated. The term $d^{(2)}$ is the coefficient of $z^3$ in the product of $[1+S(z)]V^{(2)}=(1+\alpha^{23}z+a^{15o}z^2+\delta^{12}z^3+\ldots)(1+\alpha^{23}z)=1+0\cdot z+0\cdot z^2+(\alpha^{12}+\alpha^7)z^3+\ldots$. Thus, $d^{(2)}=\alpha^{12}+\alpha^7=\alpha^9$. The term $\delta^{(2)}=d^{(2)}=\alpha^9$ since $d^{(2)}\neq 0$ and the degree of $V^{(2)}$ is $\leq k=1$. The polynomial $V^{(4)}$ equals $$f(0)V^{(2)}+d^{(2)}zK^{(2)}=\alpha^{23}(1+\alpha^{23}2)+\alpha^9z^2=\alpha^{23}+\alpha^{15}z+\delta^9z^2.$$

Finally, the parameter $K^{(4)}$ equals $$zV^{(2)}=z+\alpha^{23}z^2.$$

The above recursive procedure is continued for $k=2$ to ultimately obtain the polynomial $$V^{(6)}=\delta^{(2)}V^{(4)}+d^{(4)}z\,K^{(4)}=\alpha^{24}z+\alpha^{19}z^2+\alpha^{28}z^3.$$

The error locations are determined by the reciprocal roots of this polynomial or, equivalently, by the roots of the polynomial $\alpha^{28}+\alpha^{19}z+\alpha^{24}z^2+\alpha z^3$. The roots of this latter polynomial are $\alpha^3$, $\alpha^7$ and $\alpha^{17}$ indicating that errors occurred in positions 3, 7 and 17 just as required under the initial assumptions.

In FIG. 1, there is shown a generalized illustrative embodiment of a receiving station for receiving and decoding BCH codes in accordance with the present invention. The station includes a power sum symmetric function generator 106 and a temporary storage unit 122 for receiving BCH code words transmitted over a transmission channel 102. The power sum symmetric function generator 106 generates the power sum symmetric functions of each received code word and applies these functions to a $V^{(2t)}$ polynomial calculator 110, where $t$ represents the error-correcting-capability of the BCH code utilized. The calculator 110, as indicated by its name, calculates the polynomial $V^{(2t)}$ from the received power sum symmetric functions and applies the polynomial to Chien corrector 114. The Chien corrector 114 processes the polynomial and determines the reciprocal roots thereof. These reciprocal roots identify the error positions in the code word in question. The temporary storage unit 122 then applies the code word in question to the Chien corrector 114 which corrects the errors and applies the resultant corrected code word to a utilization circuit 118.

Figure 2:
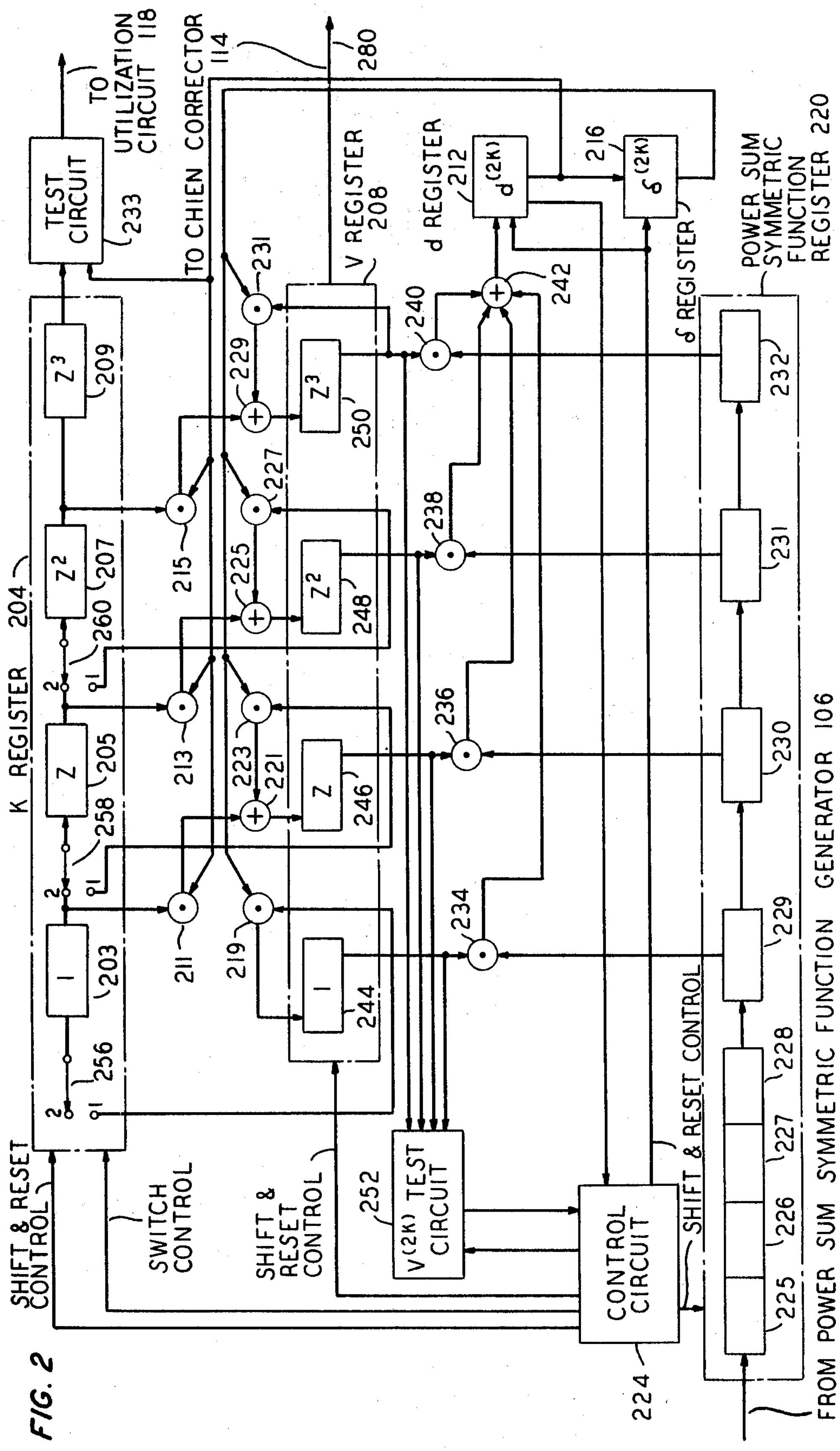
FIG. 2 shows a specific illustrative $V^{(2t)}$ polynomial calculator for use in decoding a (31,16) triple-error-correcting BCH code in accordance with the principles of the present invention.

The power sum symmetric function generator 106 might illustratively comprise a circuit of the type shown in FIG. 2 of H. O. Burton, U.S. Pat. No. 3,389,375, issued June 18, 1968. The Chien corrector 114 might illustratively comprise multiplication and addition circuits as described in Chapter 7 of the aforecited Peterson text arranged as shown in FIG. 2 of the aforecited article by R. T. Chien. An illustrative $V$(2t) polynomial calculator 110 is shown in detail in FIG. 2. Specifically, FIG. 2 shows apparatus for calculating the polynomial $V$(2t), for $t=3$. The apparatus includes a $K$ register 204 for registering the various quantities of $K$(2k+2) generated during course of the calculation of $V$(6). More specifically, registers 203, 205, 207 and 209 of the $K$ register are for registering the coefficients of $z^0$, $z^1$, $z^2$ and $z^3$, respectively, in the term $K$(2k+2). This is indicated by the symbols in each of these registers in FIG. 2. The apparatus of FIG. 2 also includes a $V$ register 208 for registering successive values of $V$(2k+2) (the particular registers for registering the coefficients of the various terms of $V$(2k+2) are also identified in FIG. 2), a $d$ register 212 for registering successive values of $d$(2k), a $\delta$ register 216 for registering successive values of $\delta^{(2k)}$, and a power sum symmetric function register 220 for registering the power sum symmetric functions generated for each received word by the power sum symmetric function generator 106 of FIG. 1.

The $V^{(6)}$ calculator of FIG. 2 will now be described assuming that the processing of some previously received power sum symmetric functions has just been completed by the calculator and that a control circuit 224 has reset each of the registers 204, 208, 212, 216 and 220 to their initial conditions. These initial conditions are that the $K$ register 294 stores a 1 in the leftmost register and a 0 in each of the other registers thereof, that the $V$ register 208 stores a 1 in the leftmost register thereof and a 0 in each of the other registers thereof, that the $d$ register 212 stores a 0, that the $\delta$ register 216 stores a 1, and that the power sum symmetric function register 220 stores 0's in all of its registers.

The first step of the operation is the application to the register 220 by the power sum symmetric function generator 106 of the power sum symmetric functions generated for the most recently received code word. Specifically, a 1 is registered in register 230, the power sum symmetric function $S_1$ in register 229, the function $S_2$ in register 228, the function $S_3$ in register 227, the function $S_4$ in register 226, and the function $S_5$ in register 225. One so-called iteration of the FIG. 2 apparatus will now be described.

The value of $d^{(2k)}=d^{(0)}$ is first calculated and applied to the $d$ register 212. (Recall that $d^{(0)}$ is the coefficient of $z$ in the product $[1+S(z)]V^{(0)}$, i.e., $d^{(0)}=S_1$.) This is done by applying the contents of registers 224 and 229 to a multiplier 234, the contents of registers 246 and 230 to a multiplier 236, the contents of registers 248 and 231 to a multiplier 238, and the contents of registers 250 and 232 to a multiplier 240. These multipliers generate the products of the contents applied respectively thereto and apply these products to a Galois Field adder 242 where the products are added together and then applied to the $d$ register 212. Since, during the first iteration, register 244 is the only register of the $V$ register 208 whose contents are nonzero, the products of all these multipliers except multiplier 234 are zero. And further, since the content of register 244 is 1 and the content of register 229 is $S_1$, the product of multiplier 234 is $S_1$. This product is applied by the multiplier 234 via the adder 242 to the $d$ register 212.

The next step in the operation is to determine whether or no the contents of the $d$ register 212 are equal to zero and to determine the degree of $V^{(2k)}=V^{(0)}$ stored in the $V$ register 208. The control circuit 224 makes the first of these determinations and a $V^{(2k)}$ test circuit 252 makes the second. In the second case the test is made by testing for the highest order nonzero term in the $V$ register 208 which term identifies the degree of $V^{(2k)}$. These tests could illustratively be made simply by applying pulses to AND gates, each of whose inputs was the output of a different one of the registers in question. Those AND gates enabled would identify the registers whose contents were nonzero. After determining the degree of $V^{(2k)}=V^{(0)}$, the test circuit 252 signals the control circuit 224 accordingly. If it is determined that the contents of the $d$ register 212 are not equal to zero and that the degree of the contents of the register 208 are less than or equal to $k$ (where, at this stage of the processing, $k=0$), then the following operations are carried out. The control circuit 224 signals the $d$ register 212 to apply its contents to the $\delta$ register 216 (and also to reregister its contents) and causes switches 256, 258 and 260 to be set in position 1. (It will be recalled that if $d^{(2k)} \neq 0$ and if the degree of $V^{(2k)} \leq k$, then $\delta^{(2k)}=d^{(2k)}$. This is the reason for shifting the contents of the $d$ register 212 to the $\delta$ register 216 under the above conditions.) The control circuit 224 next signals the $K$ register 204, the $V$ register 208, the $d$ register 212, and the $\delta$ register 216 to apply their contents to their respective outputs. Specifically, the contents of registers 203, 205, 207 and 209 of the $K$ register 204 are applied respectively to multipliers 211, 213, 215 and a test circuit 233. The contents of $d$ register 212 are also applied to each of the multipliers 211, 213 and 215. The contents of registers 244, 246, 248 and 250 of the $V$ register 208 are applied respectively to register 203 and a multiplier 219, register 205 and a multiplier 223, register 207 and a multiplier 227, and a multiplier 231. The contents of the $\delta$ register 216 are also applied to the multipliers 219, 223, 227 and 231. The multipliers 211, 213 and 215 generate the products of the respective inputs thereto and apply these products respectively to adder 221, 213 and 215 generate the products of the respective inputs thereto and apply these products respectively to adder 221, adder 225 and adder 229. Similarly, the multipliers 219, 223, 227 and 231 generate the products of the respective inputs thereto and apply these products respectively to register 244, adder 221, adder 225 and adder 229. The adders 221, 225 and 229 generate the sum of the respective inputs thereto and apply these sums respectively to registers 246, 248 and 250. The result of the above-described step is to generate the polynomial $V^{(2k+2)}$ (which at this stage of the description equals $V^{(2)}$) in the $V$ register 208. Specifically, the products generated by the multipliers 211, 213 and 215 are the coefficients of $z^0$, $z^1$ and $z^2$, respectively, in the product $d^{(2k)}\cdot K^{(2k)}$. Application of these coefficients (via the adders) to those registers of the $V$ register 208 located one stage to the right of the corresponding registers of the $K$ register 204 has the effect of multiplying the product $d^{(2k)}\cdot K^{(2k)}$ by $z$. The products generated by the multipliers 219, 223, 227 and 231 are the coefficients of $z^0$, $z^1$, $z^2$ and $z^3$, respectively, in the product $\delta^{(2k-2)}\cdot V^{(2k)}$. Adding the corresponding coefficients of the two above-mentioned products (by the adders 221, 225 and 229) yields the polynomial $V^{(2k+2)}=V^{(2)}$ as required.

The control circuit 224 then sets switches 256, 258 and 260 in position 2 and afterward shifts the contents of the $K$ register 204 one stage to the right and shifts the contents of the power sum symmetric function register 220 two stages to the right. Shifting the contents of the $K$ register 204 one stage to the right has the effect of multiplying the contents thereof (which at this stage of the operation are $V^{(0)}$) by $z$. (It will be recalled that if $d^{(2k)} \neq 0$ and the degree of $V^{(2k)} \leq k$, then $K^{(2k+2)}=zV^{(2k)}$.) Thus, after such shifting, the $K$ register 204 contains the polynomial $K^{(2b+2)}$which which at this stage of the operation is $K^{(2)}$. This completes the description of an iteration performed by the FIG. 2 apparatus when it is determined that $d^{(2k)} \neq 0$ and deg. $[V^{(2k)}] \leq k$. Both of these conditions will always exist at the beginning of the processing of a code word and thus the first iteration performed by the FIG. 2 apparatus will always be that described above.

The contents of the various registers of the FIG. 2 apparatus after the first iteration is as follows. The $K$ register 204 contains the polynomial $K^{(2)}$, the $V$ register 208 contains the polynomial $V^{(2)}$, the $d$ register 212 contains the value $d^{(0)}$, the $\delta$ register 216 contains the value $\delta^{(0)}$, and the power sum symmetric storage unit 220 contains 0's in stages 225 and 226, the function $S_5$ in stage 227, the function $S_4$ in stage 228, the function $S_3$ in stage 229, the function $S_2$ in stage 230, the function $S_1$ in stage 231, and a 1 in stage 232.

If after the first iteration of the FIG. 2 apparatus, it is determined by the control circuit 224 that either $d^{(2k)}=0$, or the degree of $V^{(2k)}>k$, then the following iteration is performed. The control circuit 224 causes switches 256, 258 and 260 to be set in position 2 and then signals the $K$ register 204, the $V$ register 208, the $d$ register 212, and $\delta$ register 216 to apply their contents to the respective outputs thereof. As already described above, the result of this is the generation of the polynomial $V^{(2k+2)}$ and the application of this polynomial to the $V$ register 204 are shifted one stage to the right (since switches 258 and 206 are set in position 2) effecting a multiplication of the contents by $z$. The control circuit 224 then cause the $K$ register 204 to shift its contents one more stage to the right and causes the power sum symmetric function storage unit 220 to shift its contents two stages to the right. With this additional shift of the $K$ register 204, the contents thereof become $K^{(2k+2)}=z^2K^{(2k)}$ as required.

To obtain the desired polynomial $V^{(2t)}=V^{(6)}$ (in the $V$ register 208), the FIG. 2 apparatus performs $t=3$ iterations. After the third iteration, the control circuit 224 signals the $V$ register 208 to apply its contents via lead 280 to the Chien corrector 114 of FIG. 1. The Chien corrector 114 then determines the reciprocal roots of this polynomial, these reciprocal roots identifying the error locations in the code word being processed.

A test circuit 233 may be included in the system to test for various uncorrectable errors. Certain uncorrectable errors are indicated, for example, if, for any $k<t$, the test circuit 233 detects the condition deg. $[K^{(2k)}] \geq t$ and $d^{(2k)} \neq 0$. This condition indicates that the degree of $V^{(2k+2)}$ is greater than $t$ which is a nonvalid condition for a $t$-error-correcting code. When this condition is detected, the test circuit 233 signals the utilization circuit 118 to disregard the code word being processed.

It is noted that detailed circuit configurations for units 224 and 233 of FIG. 2 have not been given because their arrangements are considered to be clearly within the skill of the art. Exemplary circuitry was given for other units such as units 106 and 114 of FIG. 1. Also, the circuits of FIG. 2 required for multiplying, adding and storing elements in a finite field can be implemented as described in Chapter 7 of the aforecited text by W. W. Peterson.

Finally, it is understood that the above-described arrangement is only illustrative of the application of the principles of the present invention. For example, the above-described method of correcting errors could, illustratively, be practiced on an appropriately programmed general purpose computer.

What is claimed is:

1. In a data transmission system in which information sequences are encoded into a $t$-error-correcting BCH code, a method of determining the error positions in transmitted sequences comprising the steps of generating electrical signals representing the power sum symmetric functions $S_1, S_2 \ldots S_{2t}$ of a received sequence generating an electrical signal representing a polynomial $V^{(2t)}$ by the recursive procedure $$V^{(2k+2)}=\delta^{(2k-2)}V^{(2k)}\gamma^{(2k)}K^{(2k)}z$$

$$K^{(2k+2)}=\begin{cases} z^2K^{(2k)} \text{ if } d^{(2k)}=0 \text{ or if deg. } [V^{(2k)}]>k \\ zV^{(2k)} \text{ if } d^{(2k)}\neq 0 \text{ and deg. } [V^{(2k)}]\leq k \end{cases}$$

$$\delta^{(2k)}=\begin{cases} \delta^{(2k-2)} \text{ if } d^{(2k)}=0 \text{ or if deg. } [V^{(2k)}]>k \\ d^{(2k)} \text{ if } d^{(2k)}\neq 0 \text{ and deg. } [V^{(2k)}]\leq k \end{cases}$$

where $V^{(0)}=1$, $K^{(0)}=1$, $\delta^{(2k)}=1$ if $k<0$, $1+S(z)=1+S_1z+S_1{}^2z^2+S_3z^3+\ldots$, $d^{(2k)}$ is the coefficient of $z^{2k+1}$ in the product $[1+S(z)]V^{(2k)}$ processing the electrical representation of the polynomial $V^{(2t)}$ to obtain the reciprocal roots thereof, which reciprocal roots specify the error positions in said received sequence.

2. A method as in claim 1 further comprising the step of generating a warning signal if, for any $k<t$, deg. $[K^{(2k)}]\geq t$ and $d^{(2k)}\neq 0$.

3. In a data processing system in which information sequences are encoded into a $t$-error-correcting BCH code, a method of determining error locations in a processed sequence from the power sum symmetric functions $S_1, S_2 \ldots S_{2t}$ of said sequence comprising the steps of a. generating an electrical signal representing $d^{(0)}=S_1$, b. generating an electrical signal representing $\delta^{(0)}=d^{(0)}=S_1$, c. successively generating electrical signals representing the polynomials $$V^{(2k+2)}=\delta^{(2k-2)}V^{(2k)}\gamma^{(2k)}K^{(2k)}z,$$

$$K^{(2k+2)}=\begin{cases} z^2K^{(2k)} \text{ if } d^{(2k)}=0 \text{ or if deg. } [V^{(2k)}]>k \\ zV^{(2k)} \text{ if } d^{(2k)}\neq 0 \text{ and deg. } [V^{(2k)}]\leq k \end{cases}$$

and the values $d^{(2k)}$ = coefficient of $z^{2k+1}$ in the product $[1+S(z)]V^{(2k)}$ $$\delta^{(2k)}=\begin{cases} \delta^{(2k-2)} \text{ if } d^{(2k)}=0 \text{ or if deg. } [V^{(2k)}]>k \\ d^{(2k)} \text{ if } d^{(2k)}\neq 0 \text{ and deg. } [V^{(2k)}]\leq k \end{cases}$$

to obtain $V^{(2t)}$, where $V^{(0)}=1$, $K^{(0)}=1$, $\delta^{(2k)}=1$ if $k<0$, and $1+S(z)1zS_1z+S_2z^2+S_3z^3+\ldots$, and d. generating electrical signals representing the reciprocal roots of the polynomial $V^{(2t)}$, said reciprocal root specifying the error locations in said sequence.

4. In a system for decoding code words of a $t$-error-correcting BCH code including means for generating the power sum symmetric functions $S_1, S_2 \ldots S_{2t}$ of said code words, apparatus for generating a data word $V^{(2t)}$ comprising means for successively generating $V^{(2k+2)}=\delta^{(2k-2)}V^{(2k)}+d^{(2k)}K^{(2k)}z$, where $V^{(0)}=1$ and $k=0, 1 \ldots t-1$ means for successively generating $$K^{(2k+2)}=\begin{cases} z^2K^{(2k)} \text{ if } d^{(2k)}=0 \text{ or if deg. } [V^{(2k)}]>k \\ zV^{(2k)} \text{ if } d^{(2k)}\neq 0 \text{ and deg. } [V^{(2k)}]\leq k, \end{cases}$$

where $k^{(0)}=1$, means for successively generating $d^{(2k)}$, the coefficient of $z^{2k+1}$ in the product $[1+S(z)]V^{(2k)}$, where $1+S(z)=1+S_1z+S_2z^2+S_3z^3+\ldots$, and means for successively generating $$\delta^{(2k)}=\begin{cases} \delta^{(2k-2)} \text{ if } d^{(2k)}=0 \text{ or if deg. } [V^{(2k)}]>k \\ d^{(2k)} \text{ if } d^{(2k)}\neq 0 \text{ and deg. } [V^{(2k)}]\leq k \end{cases}$$

where $\delta^{(2k)}=1$ if $k<0$.

5. Apparatus as in claim 4 further comprising a test circuit for generating a warning signal if, for any $k<t$, deg. $[K^{(2k)}]\geq t$ and $d^{(2k)}\neq 0$.

6. Apparatus as in claim 4 wherein said $V^{(2k+2)}$ generating means comprises first multiplying means for successively multiplying $V^{(2k)}$ by $\delta^{(2k-2)}$, second multiplying means for successively multiplying $K^{(2k)}z$ by $d^{(2k)}$, adding means for successively adding the products of said first and second multiplying means to obtain $V^{(2k+2)}$, and means for successively registering the values of $V^{(2k+2)}$, said registering means including a plurality of stages designated $1, z, z^2 \ldots$ for registering the coefficients of $1, z, z^2 \ldots$ respectively of $V^{(2k+2)}$.

7. Apparatus as in claim 6 wherein said $d^{(2k)}$ generating means comprises a third multiplying means for multiplying successive values of $V^{(2k)}$ by portions of $\lambda 1+S(z)]$, and means for registering the coefficient $d^{(2k)}$ of $z^{2k+1}$ in the resulting products generated by said third multiplying means.

8. Apparatus as in claim 7 wherein said $K^{(2k+2)}$ generating means comprises means for registering successive values of $K^{(2k)}$, said registering means including a plurality of stages designated $1, z, z^2 \ldots$ for registering the coefficients of $1, z, z^2 \ldots$ respectively of $K^{(2k)}$, means connected to said $V^{(2k+2)}$ registering means and to said coefficient $d^{(2k)}$ registering means for determining a first condition of $d^{(2k)}=0$ or deg. $[V^{(2k)}]Sk$, means connected to said $V^{(2k+2)}$ registering means and to said coefficient $d^{(2k)}$ registering means for determining a second condition of $d^{(2k)}\neq 0$ and deg. $[V^{(2k)}]\leq k$, means responsive to said first condition for shifting the contents of said $K^{(2k)}$ registering means two stages in the direction of the higher order terms to thereby generate $K^{(2k-2)}$, and means responsive to said second condition for shifting the contents of the $1, z, z^2 \ldots$ stages of said $V^{(2k+2)}$ registering means into the $z, z^2, z^3 \ldots$ stages respectively of said $K^{(2k)}$ registering means to thereby generate $K^{2k+2)}$.

9. Apparatus as in claim 8 wherein said $\delta^{(2k)}$ generating means comprises means for registering successive values of $\delta^{(2k)}$, and means responsive to said second condition for shifting the contents of said coefficient $d^{(2k)}$ registering means into said $\delta^{(2k)}$ registering means.